United States Patent
Lai et al.

(10) Patent No.: US 11,582,466 B2
(45) Date of Patent: Feb. 14, 2023

(54) CONSTRAINTS FOR INTER-LAYER REFERENCING

(71) Applicant: MediaTek Inc., Hsinchu (TW)

(72) Inventors: Chen-Yen Lai, Hsinchu (TW); Ching-Yeh Chen, Hsinchu (TW); Tzu-Der Chuang, Hsinchu (TW); Olena Chubach, San Jose, CA (US)

(73) Assignee: MediaTek Inc.

( * ) Notice: Subject to any disclaimer, the term of this patent is extended or adjusted under 35 U.S.C. 154(b) by 0 days.

(21) Appl. No.: 17/180,190

(22) Filed: Feb. 19, 2021

(65) Prior Publication Data

US 2021/0258587 A1  Aug. 19, 2021

Related U.S. Application Data

(60) Provisional application No. 63/011,849, filed on Apr. 17, 2020, provisional application No. 63/006,658, filed on Apr. 7, 2020, provisional application No. 62/978,360, filed on Feb. 19, 2020.

(51) Int. Cl.
  *H04N 19/169* (2014.01)
  *H04N 19/503* (2014.01)

(52) U.S. Cl.
  CPC ....... *H04N 19/188* (2014.11); *H04N 19/1883* (2014.11); *H04N 19/503* (2014.11)

(58) Field of Classification Search
  CPC . H04N 19/188; H04N 19/1883; H04N 19/503
  USPC .................................................. 375/240.12
  See application file for complete search history.

(56) References Cited

U.S. PATENT DOCUMENTS

2018/0352240 A1  12/2018  Rapaka et al.
2019/0320192 A1* 10/2019  Hannuksela ......... H04N 19/187

FOREIGN PATENT DOCUMENTS

CN  105432085 A  3/2016
CN  105519118 A  4/2016
CN  105556975 A  5/2016
(Continued)

OTHER PUBLICATIONS

China National Intellectual Property Administration, International Search Report and Written Opinion for PCT/CN2021/076876, dated May 6, 2021.

(Continued)

*Primary Examiner* — On S Mung
(74) *Attorney, Agent, or Firm* — Han IP PLLC; Andy M. Han

(57) ABSTRACT

A video coding method using inter-layer prediction or referencing is provided. A video decoder receives data from a bitstream carrying data for video pictures in a plurality of different layers. At least one of the plurality of layers comprises temporal sublayers that correspond to levels in a hierarchical temporal prediction structure. Each temporal sublayer is associated with a temporal identifier. The video decoder receives an inter-layer prediction constraint parameter constraining a maximum temporal sublayer used in inter-layer prediction. The video decoder reconstructs a first picture in a first layer by referencing data of a second picture in a second layer. A temporal identifier of the referenced data satisfies the received inter-layer prediction constraint parameter.

12 Claims, 11 Drawing Sheets

(56) References Cited

FOREIGN PATENT DOCUMENTS

| CN | 106464893 A | 2/2017 |
|---|---|---|
| WO | WO 2019141901 A1 | 7/2019 |

OTHER PUBLICATIONS

Taiwan Intellectual Property Office, Office Action for Taiwan Patent Application No. 110105788, dated Feb. 9, 2022.

\* cited by examiner

FIG. 1

Default 4x4 Quant Matrix for Intra Luma, Intra Cb, Intra Cr, Inter Luma, InterCb, InterCr

| 16 | 16 | 16 | 16 |
|---|---|---|---|
| 16 | 16 | 16 | 16 |
| 16 | 16 | 16 | 16 |
| 16 | 16 | 16 | 16 |

Default 8x8 Quant Matrix for Inter Luma, InterCb, InterCr

| 16 | 16 | 16 | 16 | 17 | 18 | 20 | 24 |
|---|---|---|---|---|---|---|---|
| 16 | 16 | 16 | 17 | 18 | 20 | 24 | 25 |
| 16 | 16 | 17 | 18 | 20 | 24 | 25 | 28 |
| 16 | 17 | 18 | 20 | 24 | 25 | 28 | 33 |
| 17 | 18 | 20 | 24 | 25 | 28 | 33 | 41 |
| 18 | 20 | 24 | 25 | 28 | 33 | 41 | 54 |
| 20 | 24 | 25 | 28 | 33 | 41 | 54 | 71 |
| 24 | 25 | 28 | 33 | 41 | 54 | 71 | 91 |

Default 8x8 Quant Matrix for Intra Luma, Intra Cb, Intra Cr

| 16 | 16 | 16 | 16 | 17 | 18 | 21 | 24 |
|---|---|---|---|---|---|---|---|
| 16 | 16 | 16 | 16 | 17 | 19 | 22 | 25 |
| 16 | 16 | 17 | 18 | 20 | 22 | 25 | 29 |
| 16 | 16 | 18 | 21 | 24 | 27 | 31 | 36 |
| 17 | 17 | 20 | 24 | 30 | 35 | 41 | 47 |
| 18 | 19 | 22 | 27 | 35 | 44 | 54 | 65 |
| 21 | 22 | 25 | 31 | 41 | 54 | 70 | 88 |
| 24 | 25 | 29 | 36 | 47 | 65 | 88 | 115 |

CONSTRAINTS FOR INTER-LAYER REFERENCING

CROSS REFERENCE TO RELATED PATENT APPLICATION(S)

The present disclosure is part of a non-provisional application that claims the priority benefit of U.S. Provisional Patent Applications No. 62/978,360 filed on 19 Feb. 2020, No. 63/006,658 filed on 7 Apr. 2020, and No. 63/011,849 filed on 17 Apr. 2020. Contents of above-listed applications are herein incorporated by reference.

TECHNICAL FIELD

The present disclosure relates generally to video coding. In particular, the present disclosure relates to inter-layer referencing and prediction.

BACKGROUND

Unless otherwise indicated herein, approaches described in this section are not prior art to the claims listed below and are not admitted as prior art by inclusion in this section.

High-efficiency video coding (HEVC) is an international video coding standard developed by the Joint Collaborative Team on Video Coding (JCT-VC). The input video signal is predicted from the reconstructed signal, which is derived from the coded picture regions. The prediction residual signal is processed by a linear transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In HEVC, a coded picture is partitioned into non-overlapped square block regions represented by the associated coding tree units (CTUs). A CTU can be partitioned into multiple non-overlapped coding units (CUs) using the recursive quadtree (QT) structure to adapt to various local motion and texture characteristics. A CTU may also be partitioned into one or multiple smaller size CUs by a quadtree with nested multi-type tree using binary and ternary split. The resulting CU partitions can be in square or rectangular shapes.

One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

A Network Abstraction Layer (NAL) unit is a logical data unit in coded video bitstream encapsulating a syntax structure, which in turn may contain an indication of the type of data to follow and bytes containing that data in the form of a raw byte sequence payload (RBSP). Each NAL unit has a NAL unit header (NUH). NAL units that are used to carry compressed video data for video coding layers (VCLs) are referred to as VCL NAL units. NAL units may also be used to carry only parameters without actual video data. These are referred to as non-VCL NAL units.

The header of each NAL unit also indicates the type of the NAL unit in a syntax element nal_unit_type. For example, nal_unit_type can be used to indicate the type of picture being carried by the NAL unit, picture types such as gradual decoding refresh (GDR) picture, intra random access picture (IRAP), instantaneous decoding refresh (IDR) picture, random access decodable leading (RADL) picture, random access skipped leading RASL) picture, etc.

A coded video may have multiple layers of data in multiple sub-streams to enable scalable video coding. The different sub-streams carrying different layers are encapsulated in different NAL units, and the header of each NAL unit (NAL unit header or NUH) identifies the layer of the NAL unit in an syntax element nuh_layer_id. Different values of nuh_layer_id indicates different layers, and VCL NAL units and the associated non-VCL NAL units that belong to the same layer have the same nuh_layer_id.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coding method using inter-layer prediction or referencing. A video decoder receives data from a bitstream carrying data for video pictures in a plurality of different layers. At least one of the plurality of layers comprises temporal sublayers that correspond to levels in a hierarchical temporal prediction structure. Each temporal sublayer is associated with a temporal identifier. The video decoder receives an inter-layer prediction constraint parameter constraining a maximum temporal sublayer used in inter-layer prediction. The video decoder reconstructs a first picture in a first layer by referencing data of a second picture in a second layer. A temporal identifier of the referenced data satisfies the received inter-layer prediction constraint parameter.

In some embodiments, the inter-layer prediction constraint parameter is signaled in a video parameter set (VPS) that is applicable to the first picture when a particular flag in the VPS indicates that the inter-layer prediction constraint parameter is present. In some embodiments, the temporal identifier of the referenced data satisfies the received inter-layer prediction constraint parameter when the temporal identifier is less than or equal to a value indicated by the inter-layer prediction constraint parameter. In some embodiments, the video decoder disallows or bypasses inter-layer prediction for the first picture when the inter-layer prediction constraint parameter is set to zero.

The video decoder may exclude a third picture to be used as reference for inter-layer prediction of the first picture when the third picture is associated with a temporal identifier that is greater than a value indicated by the inter-layer prediction constraint parameter.

In some embodiments, the inter-layer prediction constraint parameter is applicable only when the second layer is used as a reference layer for inter-layer prediction of the first layer and not applicable when another layer is used as the reference layer for inter-layer prediction of the first layer. When the inter-layer prediction constraint parameter is set to zero, the second layer is not used as a reference layer for decoding the first layer using inter-layer prediction. In some embodiments, each entry in an inter-layer reference prediction (ILRP) list (of a slice) of the first picture is either an RAP picture, or a reference picture in a reference layer having a temporal identifier that is less than an inter-layer prediction constraint parameter that is applicable to the first layer and the reference layer.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 1 illustrates the content of default quantization matrices having default values.

DETAILED DESCRIPTION

Figure 2:
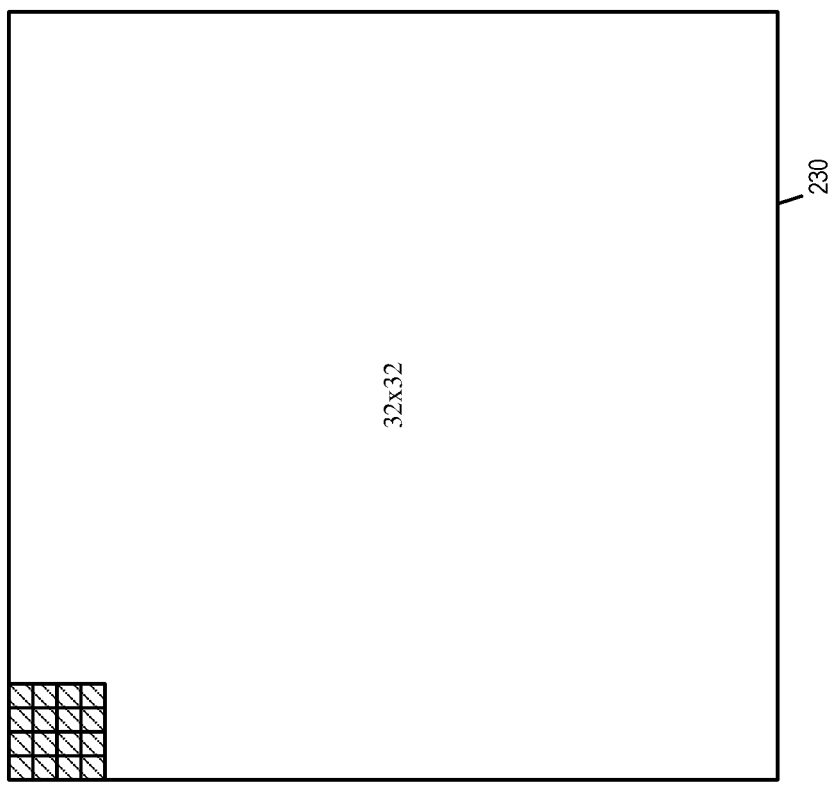
FIG. 2 illustrates up-sampling a base scaling matrix to derive quantization matrices of larger blocks.
Figure 2:
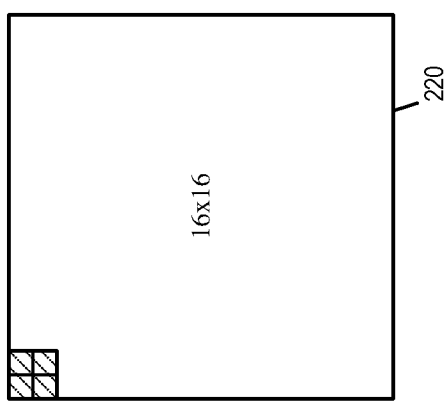
Figure 2:
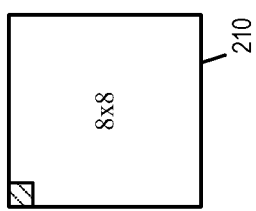

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Quantization Matrices

Block-based hybrid video coding schemes which imply transform coding of the residual signal use frequency dependent scaling to control the distribution of the quantization distortion across different frequencies in a transform unit (TU). In order to achieve perceptually uniform quantization across spatial frequencies, a quantization matrix weights each frequency channel associated with the transform coefficient according to the perceived sensitivity over its related frequency range such that lower frequency coefficients in the transform block are quantized in finer quantization step sizes than higher frequency coefficients. At the decoder, a corresponding quantization matrix inversely weighs the de-quantized transform coefficients of each frequency channel. Quantization matrix has been successfully utilized in various video coding standards, such as H.264/AVC (Advanced Video Coding) and H.265/HEVC (High Efficiency Video Coding) and in numerous commercial products, in order to improve the subjective quality of video content.

Quantization matrices (QMs) are used for achieving frequency dependent scaling. Consequently, quantization matrices may also be referred to as scaling matrices, scaling lists, or scaling list matrices. For HEVC, frequency dependent scaling can be enabled by using the syntax element scaling_list_enabled_flag in sequence parameter sets (SPS). When this flag is enabled, additional flags in SPS and picture parameter sets (PPS) control whether the default quantization matrices or non-default quantization matrices are used. FIG. 1 illustrates the content of default quantization matrices of sizes 4×4 and 8×8 having default values. Non-default quantization matrices can be optionally transmitted in the bitstream in SPS or PPS.

For H.265/HEVC, depending on the size and type of the transform block, the following quantization matrices are supported, depending on the size and type of the transform block. Luma: Intra4×4, Inter4×4, Intra8×8, Inter8×8, Intra16×16, Inter16×16, Intra32×32, Inter32×32. Cb: Intra4×4, Inter4×4, Intra8×8, Inter8×8, Intra16×16, Inter16× 16. Cr: Intra4×4, Inter4×4, Intra8×8, Inter8×8, Intra16×16, Inter16×16.

In order to reduce the memory needed to store the quantization matrices, 8×8 matrices are used to derive quantization matrices of larger transform blocks (e.g., 16×16, 32×32, 64×64, etc.). Thus, the 8×8 default quantization matrices are called base scaling matrices. For example, the quantization matrices for transform blocks of sizes 16×16 and 32×32 are obtained from the 8×8 base scaling matrices of the same type by up-sampling using replication.

FIG. 2 illustrates up-sampling a base scaling matrix (8×8 quantization matrix) to derive quantization matrices of larger blocks. As illustrated, a 1×1 region of an 8×8 quantization matrix 210 is up-sampled into a 2×2 region in a 16×16 quantization matrix 220 and a 4×4 region in a 32×32 quantization matrix 230.

II. Luma Mapping with Chroma Scaling (LMCS)

Luma Mapping with Chroma Scaling (LMCS) is a video coding tool that includes 1) a luma mapping process for mapping input luma code values to a new set of code values for use inside the coding loop; and 2) a chroma scaling process for scaling chroma residue values dependent on the luma component. The first process, luma mapping, aims at improving the coding efficiency for standard and high dynamic range video signals by making better use of the range of luma code values allowed at a specified bit depth. The second process, chroma scaling, manages relative compression efficiency for the luma and chroma components of the video signal. The luma mapping process of LMCS is applied at the pixel sample level, and is implemented using a piecewise linear model. The chroma scaling process is applied at the chroma block level, and is implemented using a scaling factor derived from reconstructed neighboring luma samples of the chroma block.

Figure 3:
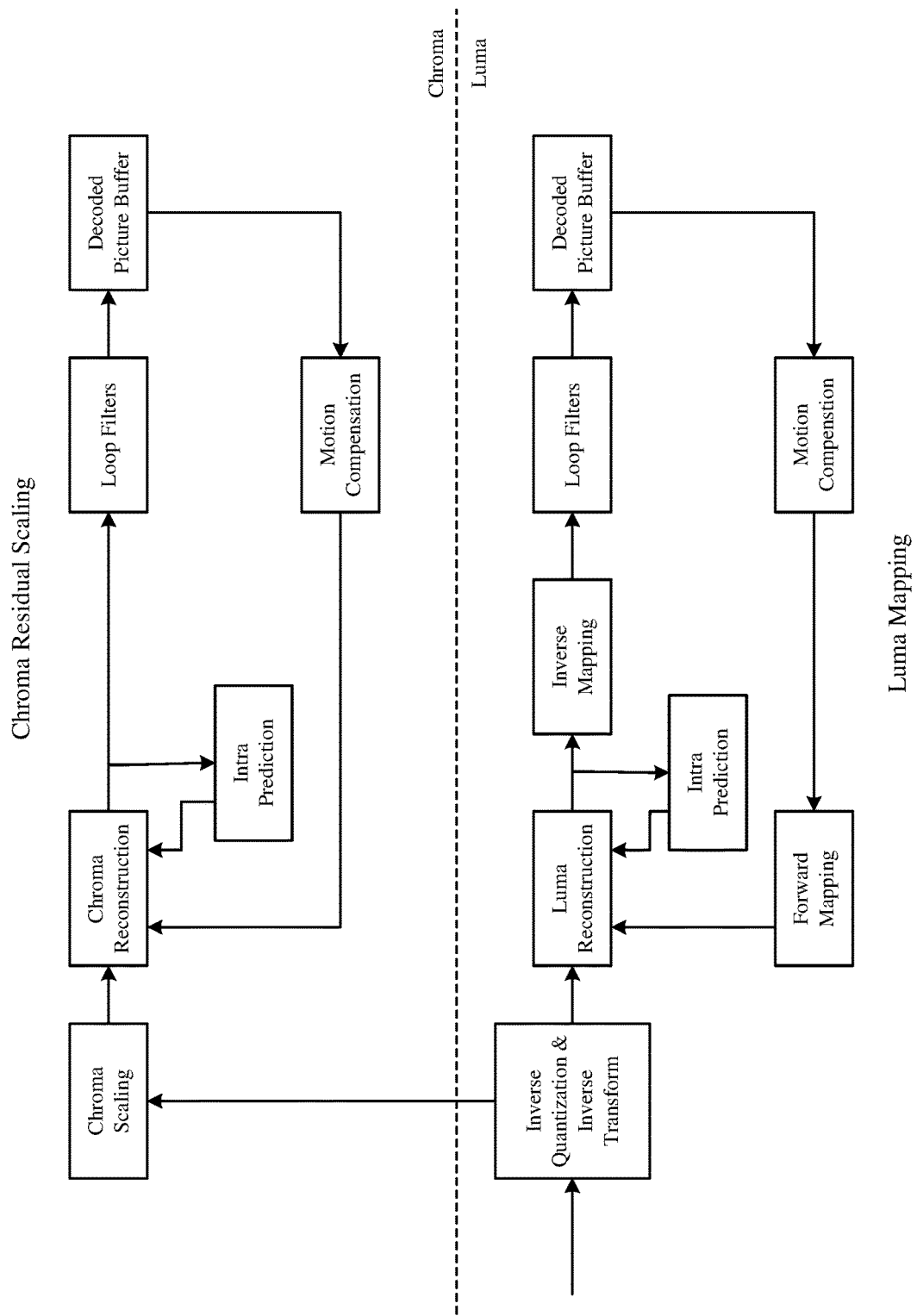
FIG. 3 shows an example of luma mapping with chroma scaling (LMCS).

When LMCS is applied, video samples are coded and reconstructed in a reshaped domain before loop filtering. The reshaped domain reconstructed samples are converted to an original domain by using the inverse mapping. The loop-filtered original domain reconstructed samples are stored in the decoded picture buffer (DPB). For inter mode, the motion compensated (MC) predictors are converted to the reshaped domain by using the forward luma mapping. FIG. 3 shows an example of the luma mapping process under LMCS.

III. Signaling LMCS and QM

Adaptation Parameter Set (APS) is a syntax structure in coded video containing parameters applicable to slices as determined by syntax elements found in slice headers. Table 1 shows an Adaptation Parameter Set (APS) that specifies parameters for scaling lists, LMCS, and adaptive loop filter (ALF):

TABLE 1

| | Descriptor |
|---|---|
| adaptation_parameter_set_rbsp( ) { | |
|    adaptation_parameter_set_id | u(5) |
|    aps_params_type | u(3) |
|    if( aps_params_type = = ALF_APS ) | |
|      alf_data( ) | |
|    else if( aps_params_type = = LMCS_APS ) | |
|      lmcs_data( ) | |
|    else if( aps_params_type = = SCALING_APS ) | |
|      scaling_list_data( ) | |
|    aps_extension_flag | u(1) |
|    if( aps_extension_flag ) | |
|      while( more_rbsp_data( ) ) | |
|         aps_extension_data_flag | u(1) |
|    rbsp_trailing_bits( ) | |
| } | |

The syntax element adaptation_parameter_set_id provides an identifier for the APS for reference by other syntax elements. The syntax element aps_parameter_type specifies the type of the APS parameter. When aps_params_type is equal to ALF_APS or SCALING_APS, the value of adaptation_parameter_set_id shall be in the range of 0 to 7, inclusive. When aps_params_type is equal to LMCS_APS, the value of adaptation_parameter_set_id shall be in the range of 0 to 3, inclusive.

In some embodiments, APS NAL units with a particular value of aps_params_type, regardless of the nuh_layer_id values, share the same value space for adaptation_parameter_set_id. APS NAL units with different values of aps_params_type use separate values spaces for adaptation_parameter_set_id.

In some embodiments, all APS NAL units with a particular value of aps_params_type can be referenced by each other if the following two conditions are met: (1) the value of nuh_layer_id of the referenced layer is less than or equal to the value of nuh_layer_id of current layer and the referenced layer is included in at least one OLS that includes the current layer, and (2) the TemporalId of the referenced APS NAL unit shall be less than or equal to the TemporalId of the picture associated with the PH or the coded slice NAL unit.

Table 2 shows a picture header (PH) that specifies ALF, LMCS, and scaling list parameters at picture level.

TABLE 2

| | Descriptor |
|---|---|
| picture_header_structure( ) { | |
|   ... | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag) | |
|           ph_cc_alf_cb_aps_id | u(3) |
|         ph_cc_alf_cr_enabled_flag | u(1) |
|         if( ph_cc_alf_cr_enabled_flag) | |
|           ph_cc_alf_cr_aps_id | u(3) |
|       } | |
|     } | |
|   } | |
|   if( sps_lmcs_enabled_flag) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
|   if( sps_scaling_list_enabled_flag) { | |
|     ph_scaling_list_present_flag | u(1) |
|     if( ph_scaling_list_present_flag) | |
|       ph_scaling_list_aps_id | u(3) |
| } | |

The syntax element ph_pic_parameter_set_id specifies the value of pps_pic_parameter_set_id for the PPS in use. The value of ph_pic_parameter_set_id shall be in the range of 0 to 63, inclusive. It is a requirement of bitstream conformance that the value of TemporalId of the PH shall be greater than or equal to the value of TemporalId of the PPS that has pps_pic_parameter_set_id equal to ph_pic_parameter_set_id.

In some embodiments, if the value of nuh_layer_id of the PPS NAL unit with pps_pic_parameter_set_id equal to ph_pic_parameter_set_id is less than the value of nuh_layer_id of the coded picture NAL unit, the value of TemporalId of the PPS with pps_pic_parameter_set_id equal to ph_pic_parameter_set_id is constrained to be less than max_tid_il_ref_pics_plus1[refPicVpsLayerId] (or max_tid_il_ref_pics_plus1[curPicVpsLayerId][refPicVpsLayerId]), with refPicVpsLayerId equal to the VPS layer ID of the referenced PPS (and curPicVpsLayerId equal to the VPS layer ID of the picture associated with the PH).

The syntax element ph_alf_aps_id_luma[i] specifies the adaptation_parameter_set_id of the i-th ALF APS that the luma component of the slices associated with the PH refers to. The value of alf_luma_filter_signal_flag of the APS NAL unit having aps_params_type equal to ALF_APS and adaptation_parameter_set_id equal to ph_alf_aps_id_luma[i]

shall be equal to 1. The TemporalId of the APS NAL unit having aps_params_type equal to ALF_APS and adaptation_parameter_set_id equal to ph_alf_aps_id_luma[i] shall be less than or equal to the TemporalId of the picture associated with the PH.

The syntax element ph_alf_aps_id_chroma specifies the adaptation_parameter_set_id of the ALF APS that the chroma component of the slices associated with the PH refers to. The value of alf_chroma_filter_signal_flag of the APS NAL unit having aps_params_type equal to ALF_APS and adaptation_parameter_set_id equal to ph_alf_aps_id_chroma shall be equal to 1. The TemporalId of the APS NAL unit having aps_params_type equal to ALF_APS and adaptation_parameter_set_id equal to ph_alf_aps_id_chroma shall be less than or equal to the TemporalId of the picture associated with the PH.

The syntax element ph_cc_alf_cb_aps_id specifies the adaptation_parameter_set_id of the ALF APS that the Cb chroma component of the slices associated with the PH refers to. The value of alf_cc_cb_filter_signal_flag of the APS NAL unit having aps_params_type equal to ALF_APS and adaptation_parameter_set_id equal to ph_cc_alf_cb_aps_id shall be equal to 1.

The syntax element ph_cc_alf_cr_aps_id specifies the adaptation_parameter_set_id of the ALF APS that the Cr chroma component of the slices associated with the PH refers to. The value of alf_cc_cr_filter_signal_flag of the APS NAL unit having aps_params_type equal to ALF_APS and adaptation_parameter_set_id equal to ph_cc_alf_cr_aps_id shall be equal to 1.

The syntax element ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

The syntax element ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

Table 3 shows a slice header (SH) that specifies ALF, LMCS, and scaling list parameters at slice level.

TABLE 3

| | Descriptor |
|---|---|
| slice_header_structure( ) { | |
| ... | |
| if( sps_alf_enabled_flag && !alf_info_in_ph_flag ) { | |
|   slice_alf_enabled_flag | u(1) |
|   if( slice_alf_enabled_flag) { | |
|     slice_num_alf_aps_ids_luma | u(3) |
|     for( i = 0; i < slice_num_alf_aps_ids_luma; i++ ) | |
|       slice_alf_aps_id_luma[ i ] | u(3) |
|     if( ChromaArrayType != 0 ) | |
|       slice_alf_chroma_idc | u(2) |
|     if( slice_alf_chroma_idc) | |
|       slice_alf_aps_id_chroma | u(3) |
|     if( sps_ccalf_enabled_flag ) { | |
|       slice_cc_alf_cb_enabled_flag | u(1) |
|       if( slice_cc_alf_cb_enabled_flag) | |
|         slice_cc_alf_cb_aps_id | u(3) |
|       slice_cc_alf_cr_enabled_flag | u(1) |
|       if( slice_cc_alf_cr_enabled_flag) | |
|         slice_cc_alf_cr_aps_id | u(3) |
| } | |

TABLE 3-continued

| | Descriptor |
|---|---|
|   } | |
| } | |

The syntax element slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i]. The value of alf_luma_filter_signal_flag of the APS NAL unit having aps_params_type equal to ALF_APS and adaptation_parameter_set_id equal to slice_alf_aps_id_luma[i] shall be equal to 1.

The syntax element slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma. The value of alf_chroma_filter_signal_flag of the APS NAL unit having aps_params_type equal to ALF_APS and adaptation_parameter_set_id equal to slice_alf_aps_id_chroma shall be equal to 1.

The syntax element slice_cc_alf_cb_aps_id specifies the adaptation_parameter_set_id that the Cb chroma component of the slice refers to. The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id. The value of alf_cc_cb_filter_signal_flag of the APS NAL unit having aps_params_type equal to ALF_APS and adaptation_parameter_set_id equal to slice_cc_alf_cb_aps_id shall be equal to 1.

The syntax element slice_cc_alf_cr_aps_id specifies the adaptation_parameter_set_id that the Cr chroma component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id. The value of alf_cc_cr_filter_signal_flag of the APS NAL unit having aps_params_type equal to ALF_APS and adaptation_parameter_set_id equal to slice_cc_alf_cr_aps_id shall be equal to 1.

APS is a syntax structure encapsulated in a non-VCL NAL unit (or APS NAL). Let apsLayerId be the value of the nuh_layer_id of a particular APS NAL unit, and vclLayerId be the value of the nuh_layer_id of a particular VCL NAL unit. In some embodiments, the particular VCL NAL unit is constrained to not refer to the particular APS NAL unit unless apsLayerId is less than or equal to vclLayerId and the layer with nuh_layer_id equal to apsLayerId is included in at least one Output Layer Set (OLS) that includes the layer with nuh_layer_id equal to vclLayerId.

IV. Inter-Layer Referencing

In some embodiments, pictures in a video sequence may be coded according to a hierarchical temporal prediction structure as the multiple layers of video data are used to implement temporally scalable video. Pictures in different levels of the hierarchy may reference each other in an inter-layer referencing or prediction scheme. Each level of the hierarchical temporal prediction structure may correspond to a sublayer or a temporal scalable layer of a temporal scalable bitstream, consisting of VCL NAL units with a specific temporal identifier (TemporalId or a syntax element nuh_temporal_id_plus1 in the NUH). Each NAL unit is associated with a temporal identifier to indicate a level in the hierarchical temporal prediction structure. The temporal identifier of a NAL unit may be also be referred to as the temporal identifier of the video content (e.g., a video picture or a slice of the video picture) being carried by the NAL unit.

In inter-layer referencing or prediction, a current picture may be coded by referencing another picture in another layer and/or another temporal sublayer. Such a reference picture is referred to as an inter-layer reference picture, or ILRP. In some embodiments, the ILRP is in a same access unit (AU) as the current picture, with nuh_layer_id less than the nuh_layer_id of the current picture, and is marked as "used for long-term reference". When encoding or decoding video data of a current layer by referencing data from another layer as a reference layer, the data of the reference layer may be video data from a VCL NAL unit, or parameters from a non-VCL NAL unit (e.g., an APS NAL).

In some embodiments, such inter-layer referencing is constrained based on parameters associated with the current layer and the reference layer. Specifically, when decoding a first layer, constraints is applied for determining whether pictures or APS from a second layer can be used as reference. For example, all APS NAL units can be referenced if the value of nuh_layer_id of the referenced layer is less than the value of nuh_layer_id of current layer and the referenced layer is included in at least one OLS that includes the current layer. And if the value of nuh_layer_id of the referenced layer is equal to the value of nuh_layer_id of current layer, the TemporalId of the referenced APS NAL unit shall be less than or equal to the TemporalId of the picture associated with the PH or the coded slice NAL unit. Otherwise, if the value of nuh_layer_id of the referenced layer is less than the value of nuh_layer_id of current layer, the referenced APS NAL unit is valid, regardless of TemporalId. The APS NAL units with a particular value of aps_params_type can be ALF_APS, LMCS_APS, or SCALING_APS. This constraint on the relationship between the reference layer and the current layer is applicable to all syntax elements in PH and SH that are used to indicate the referenced APS identifier in PH and SH, syntax elements such as ph_alf_aps_id_luma[ ], ph_alf_aps_id_chroma, ph_cc_alf_cb_aps_id, ph_cc_alf_cr_aps_id, slice_alf_aps_id_luma[ ], slice_alf_aps_id_chroma, slice_cc_alf_cb_aps_id, slice_cc_alf_cr_aps_id, ph_lmcs_aps_id, and ph_scaling_list_aps_id.

For example, the syntax element ph_alf_aps_id_chroma specifies the adaptation_parameter_set_id of the ALF APS that the chroma component of the slices associated with the PH refers to. The value of alf_chroma_filter_signal_flag of the APS NAL unit having aps_params_type equal to ALF_APS and adaptation_parameter_set_id equal to ph_alf_aps_id_chroma shall be equal to 1. If the value of nuh_layer_id of the APS NAL unit is equal to the value of nuh_layer_id of the picture associated with the PH, then TemporalId of the APS NAL unit having aps_params_type equal to ALF_APS and adaptation_parameter_set_id equal to ph_alf_aps_id_chroma shall be less than or equal to the TemporalId of the picture associated with the PH.

As another example, the syntax element slice_alf_aps_id_chroma specifies the adaptation_parameter_set_id of the ALF APS that the chroma component of the slice refers to. If the value of nuh_layer_id of the APS NAL unit is equal to the value of nuh_layer_id of the coded slice NAL unit, then TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma. The value of alf_chroma_filter_signal_flag of the APS NAL unit having aps_params_type equal to ALF_APS and adaptation_parameter_set_id equal to slice_alf_aps_id_chroma shall be equal to 1.

In some embodiments, inter-layer prediction is subject to constraint on maximum temporal sublayer or temporal identifier. Table 4A shows the syntax of a Video Parameter Set (VPS) that specifies constraints on the maximum temporal sublayer:

TABLE 4A

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) | |
|   { | |
|     vps_independent_layer_flag[ i ] | u(1) |
|     if( !vps_independent_layer_flag[ i ]) { | |
|       for( j = 0; j < i; j++ ) | |
|         vps_direct_ref_layer_flag[ i ][ j ] | u(1) |
|       max_tid_ref_present_flag[ i ] | u(1) |
|       if( max_tid_ref_present_flag[ i ]) | |
|         max_tid_il_ref_pics_plus1[ i ] | u(3) |
|     } | |
|   } | |
| } | |

The value of max_tid_ref_present_flag[i] being 1 specifies that the syntax element max_tid_il_ref_pics_plus1[i] is present. The value of max_tid_ref_present_flag[i] being 0 specifies that the syntax element max_tid_il_ref_pics_plus1[i] is not present.

The syntax element max_tid_il_ref_pics_plus1[i] is signalled in the VPS to constrain the maximum temporal sublayer allowed as reference for inter-layer prediction of the i-th layer. The value of max_tid_il_ref_pics_plus1[i] being 0 specifies that inter-layer prediction is not used by non-IRAP pictures of the i-th layer. The value of max_tid_il_ref_pics_plus1[i] being greater than 0 specifies that, for decoding pictures of the i-th layer, no picture with TemporalId greater than max_tid_il_ref_pics_plus1[i]−1 is used as ILRP. When not present, the value of max_tid_il_ref_pics_plus1[i] is inferred to be equal to 7. In some embodiments, the value of of max_tid_il_ref_pics_plus1[i] is inferred to be equal to vps_max_sublayers_minus1 plus 2, when not present.

The value of the syntax element vps_max_sublayers_minus1 plus 1 specifies the maximum number of temporal sublayers that may be present in a layer in each CVS referring to the VPS. The value of vps_max_sublayers_minus1 is constrained to be in the range of 0 to 6, inclusive.

In some embodiments, the value of max_tid_il_ref_pics_plus1[i] is constrained to be in the range of 0 to vps_max_sublayers_minus1+1, inclusive. When vps_max_sublayers_minus1 is equal to 0, the value of max_tid_il_ref_pics_plus1[i] is inferred to be equal to 0. When vps_max_sublayers_minus1 is greater than 0 and vps_all_layers_same_num_sublayers_flag is equal to 1, the value of max_tid_il_ref_pics_plus1[i] is inferred to be equal to vps_max_sublayers_minus1+1. In some embodiments, only one (common) value of max_tid_il_ref_pics_plus1 is sent for all layers in the CVS referring to the VPS. In this case, this value is limited to be not larger than a minimum number of sublayers in all layers of the CVS referring to the VPS. In some embodiments, only one value of max_tid_il_ref_pics_plus1 is sent for all layers in the CVS referring to the VPS, when vps_max_sublayers_minus1 is greater than 0 and vps_all_layers_same_num_sublayers_flag is equal to 1.

The syntax element max_tid_il_ref_pics_plus1[i] in the VPS of Table 4A specifies a constraint on the pictures that can be used as reference (or ILRP) for decoding the i-th layer in inter-layer prediction. In some embodiments, the signaling of the constraint on the maximum temporal sublayer allowed for inter-layer prediction can be further generalized. For example, for decoding the i-th layer in inter-layer prediction, the syntax element max_tid_il_ref_pics_plus1[i][j] places constraints on whether a picture from j-th layer can be used as reference in a two-dimensional fashion. Specifically, the value of max_tid_il_ref_pics_plus1[i][j] being equal to 0 specifies that the j-th layer is not used as reference layer for inter-layer prediction by non-IRAP pictures of the i-th layer. The value of max_tid_il_ref_pics_plus1[i][j] being greater than 0 specifies that, for decoding pictures of the i-th layer, no picture from the j-th layer with TemporalId greater than max_tid_il_ref_pics_plus1[i][j]−1 is used as ILRP. When not present, the value of max_tid_il_ref_pics_plus1[i][j] is inferred to be equal to 7. Table 4B shows a VPS that specifies constraints on inter-layer prediction with respect to both the decoded layer and the referenced layer:

TABLE 4B

|  | Descriptor |
|---|---|
| video_parameter_set_rbsp( ) { |  |
| ... |  |
| vps_max_layers_minus1 | u(6) |
| vps_max_sublayers_minus1 | u(3) |
| if( vps_max_layers_minus1 > 0 && |  |
| vps_max_sublayers_minus1 > 0 ) |  |
| vps_all_layers_same_num_sublayers_flag | u(1) |
| if( vps_max_layers_minus1 > 0 ) |  |
| vps_all_independent_layers_flag | u(1) |
| for( i = 0; i <= vps_max_layers_minus1; i++ ) { |  |
| vps_layer_id[ i ] | u(6) |
| if( i > 0 && !vps_all_independent_layers_flag ) |  |
| { |  |
| vps_independent_layer_flag[ i ] | u(1) |
| if( !vps_independent_layer_flag[ i ] ) { |  |

TABLE 4B-continued

|  | Descriptor |
|---|---|
| max_tid_ref_present_flag[ i ] | u(1) |
| for( j = 0; j < i; j++ ) { |  |
| vps_direct_ref_layer_flag[ i ][ j ] | u(1) |
| if( max_tid_ref_present_flag[ i ] && |  |
| vps_direct_ref_layer_flag[ i ][ j ] ) |  |
| max_tid_il_ref_pics_plus1[ i ][ j ] | u(3) |
| } |  |
| } |  |
| } |  |
| } |  |

The value of max_tid_ref_present_flag[i] being equal to 1 specifies that the syntax element max_tid_il_ref_pics_plus1[i][j] is present. max_tid_ref_present_flag[i] equal to 0 specifies that the syntax element max_tid_il_ref_pics_plus1[i][j] is not present.

Figure 4:
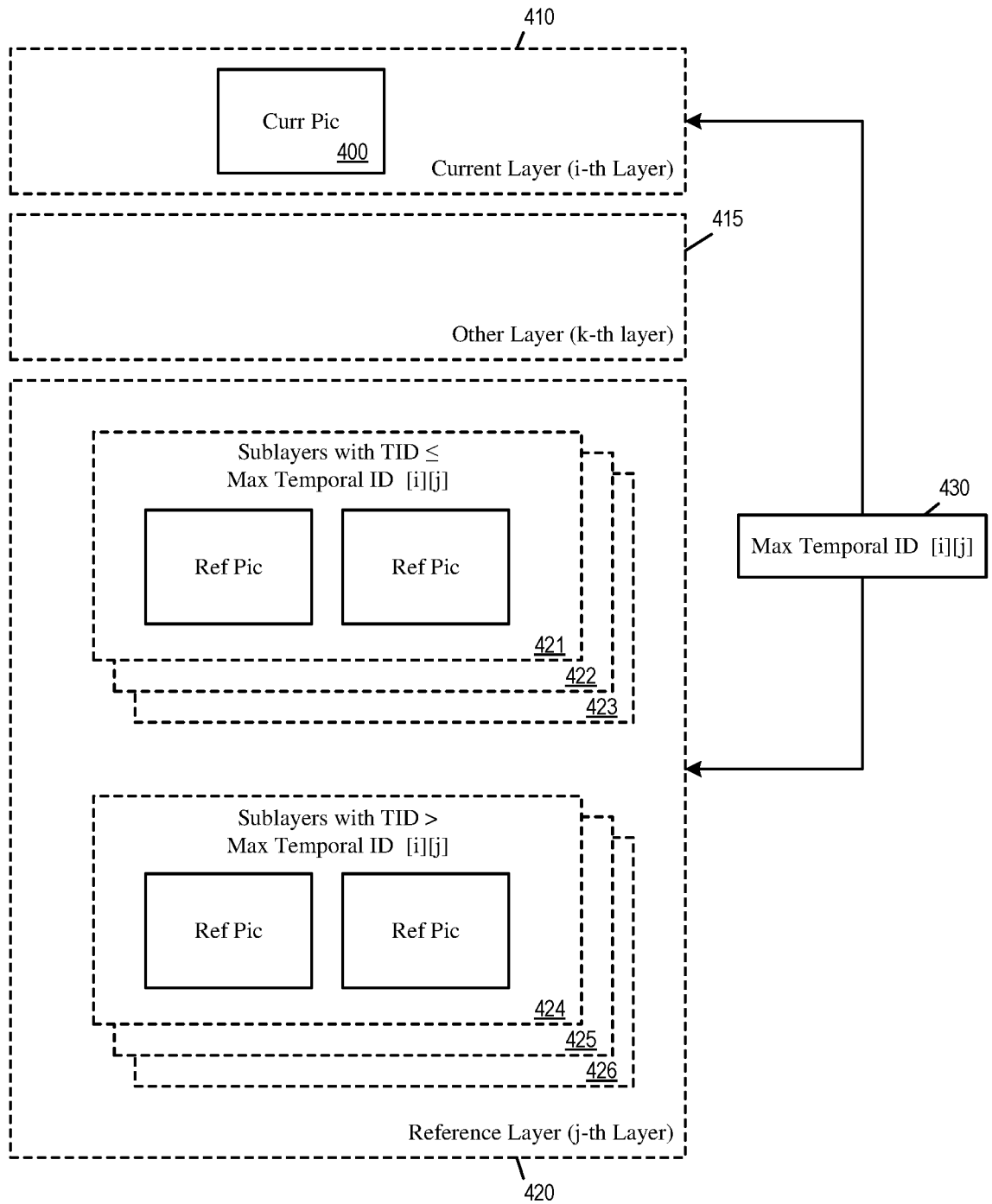
FIG. 4 conceptually illustrates constraint on inter-layer prediction.

FIG. 4 conceptually illustrates constraint on inter-layer prediction. The figure illustrates a current picture 400 that is to be encoded or decoded by inter-layer prediction. Specifically, the current picture 400 has at least one slice having video content at a i-th layer 410 that is to be encoded or decoded by referencing video content at a j-th layer 420. The j-th layer have video content in different temporal sublayers 421-426 that are assigned corresponding respective temporal identifiers (TemporalId). The different temporal sublayers correspond to different levels in a hierarchical temporal prediction structure (for temporally scalable video).

Whether the video content of the sublayers can be referenced by the current picture 400 for inter-layer prediction is subject to a constraint 430 on maximum temporal identifier between the i-th layer 410 and the j-th layer 420 (e.g., the syntax element max_tid_il_ref_pics_plus1[i][j]). In the example, the sublayers 421-423 have temporal identifiers that satisfy the constraint 430 maximum temporal identifier), and the pictures in these sublayers may serve as reference pictures (ILRPs) for encoding or decoding the current picture 400 for inter-layer prediction. On the other hand, the sublayers 424-426 have temporal identifiers that do not satisfy the constraint 430 (>maximum temporal identifier), and the pictures in these sublayers may not serve as reference pictures for encoding or decoding the current picture 400 for inter-layer prediction.

The figure also illustrates a k-th layer 415. In some embodiments, pictures in temporal sublayers of the k-th layer may serve as reference for inter-layer prediction of the i-th layer 410 subject to a constraint on maximum temporal identifier between the between the i-th layer and the k-th layer (e.g., max_tid_il_ref_pics_plus1[i][k].)

In some embodiments, reference picture lists construction is subject to a set of constraints. For example, in some embodiments, the picture referred to by each ILRP entry in RefPicList[0] and/or RefPicList[1] of a slice of the current picture is constrained to have TemporalId less than max_tid_il_ref_pics_plus1[refPicVpsLayerId] (or max_tid_il_ref_pics_plus1[currPicVpsLayerID][refPicVpsLayerId]), with refPicVpsLayerId equal to GeneralLayerIdx[refVpsLayerId] of the referenced picture (and curPicVpsLayerId equal to GeneralLayerIdx[curVpsLayerId]) or is an RAP. For example, the picture referred to by each ILRP entry in RefPicList[0] and/or RefPicList[1] of a slice of the current picture have TemporalId less than max_tid_il_ref_pics_plus1[refPicVpsLayerId] (or max_tid_il_ref_pics_plus1 [curPicVpsLayerId] [refPicVpsLayerId]), with refPicVpsLayerId equal to the VPS layer ID of the referenced picture (and curPicVpsLayerId equal to the VPS layer ID of current picture), or is an RAP. In the example of FIG. 4, the ILRP entries of (a slice of) the current picture 400 may refer to pictures in sublayers 421-423 but not the pictures in sublayers 424-426 based on the constraint 430 on maximum temporal identifier.

In some embodiments, constraints on the referenced APS NAL unit may also be applied. For example, if the value of nuh_layer_id of the APS NAL unit is less than the value of nuh_layer_id of the picture associated with the PH or the coded slice NAL unit, the referenced APS NAL unit is constrained to have TemporalId less than max_tid_il_ref_pics_plus1[refPicVpsLayerId] (or max_tid_il_ref_pics_plus1[curPicVpsLayerId] [refPicVpsLayerId]), with refPicVpsLayerId equal to the VPS layer ID of the referenced layer or APS NAL unit (and curPicVpsLayerId equal to the VPS layer ID of the picture associated with the PH or the coded slice NAL unit). The APS NAL units with a particular value of aps_params_type can be ALF APS, LMCS_APS, or SCALING_APS. This constraint is applicable to syntax elements used to indicate the referenced APS identifier in PH and SH, syntax elements such as ph_alf_aps_id_luma[ ], ph_alf_aps_id_chroma, ph_cc_alf_cb_aps_id, ph_cc_alf_cr_aps_id, slice_alf_aps_id_luma[ ], slice_alf_aps_id_chroma, slice_cc_alf_cb_aps_id, slice_cc_alf_cr_aps_id, ph_lmcs_aps_id, ph_scaling_list_aps_id.

For example, the syntax element ph_alf_aps_id_chroma specifies the adaptation_parameter_set_id of the ALF APS that the chroma component of the slices associated with the PH refers to. The value of alf_chroma_filter_signal_flag of the APS NAL unit having aps_params_type equal to ALF_APS and adaptation_parameter_set_id equal to ph_alf_aps_id_chroma shall be equal to 1. The TemporalId of the APS NAL unit having aps_params_type equal to ALF_APS and adaptation_parameter_set_id equal to ph_alf_aps_id_chroma shall be less than or equal to the TemporalId of the picture associated with the PH. If the value of nuh_layer_id of the APS NAL unit is less than the value of nuh_layer_id of the picture associated with the PH, the referenced APS NAL unit shall have TemporalId less than max_tid_il_ref_pics_plus1[refPicVpsLayerId] (or max_tid_il_ref_pics_plus1[curPicVpsLayerId][refPicVpsLayerId]), with refPicVpsLayerId equal to the VPS layer ID of the referenced layer or APS NAL unit (and curPicVpsLayerId equal to the VPS layer ID of the picture associated with the PH).

As another example, the syntax element slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. If the value of nuh_layer_id of the APS NAL unit is less than the value of nuh_layer_id of the coded slice NAL unit, the referenced APS NAL unit shall have TemporalId less than max_tid_il_ref_pics_plus1[refPicVpsLayerId], (or max_tid_il_ref_pics_plus1[curPicVpsLayerId][refPicVpsLayerId]) with refPicVpsLayerId equal to the VPS layer ID of the referenced layer or APS NAL unit (and curPicVpsLayerId equal to the VPS layer ID of the coded slice NAL unit).

When slice_alf_enabled_flag is equal to 1 and slice_alf_aps_id_chroma is not present, the value of slice_alf_aps_id_chroma is inferred to be equal to the value of ph_alf_aps_id_chroma. The value of alf_chroma_filter_signal_flag of the APS NAL unit having aps_params_type equal to ALF_APS and adaptation_parameter_set_id equal to slice_alf_aps_id_chroma shall be equal to 1.

In some embodiments, the constraint on maximum sublayer and the constraint on the referenced APS NAL unit can be combined. The APS NAL units with a particular value of aps_params_type can be ALF_APS, LMCS_APS, or SCALING APS. This combined constraint is applicable to syntax elements used to indicate the referenced APS identifier in PH and SH, syntax elements such as ph_alf_aps_id_luma[ ], ph_alf_aps_id_chroma, ph_cc_alf_cb_aps_id, ph_cc_alf_cr_aps_id, slice_alf_aps_id_luma[ ], slice_alf_aps_id_chroma, slice_cc_alf_cb_aps_id, slice_cc_alf_cr_aps_id, ph_lmcs_aps_id, ph_scaling_list_aps_id.

For example, the syntax element ph_alf_aps_id_chroma specifies the adaptation_parameter_set_id of the ALF APS that the chroma component of the slices associated with the PH refers to. The value of alf_chroma_filter_signal_flag of the APS NAL unit having aps_params_type equal to ALF_APS and adaptation_parameter_set_id equal to ph_alf_aps_id_chroma shall be equal to 1. If the value of nuh_layer_id of the APS NAL unit is equal to the value of nuh_layer_id of the picture associated with the PH, the TemporalId of the APS NAL unit having aps_params_type equal to ALF_APS and adaptation_parameter_set_id equal to ph_alf_aps_id_chroma shall be less than or equal to the TemporalId of the picture associated with the PH. Otherwise (the value of nuh_layer_id of the APS NAL unit is less than the value of nuh_layer_id of the picture associated with the PH), the referenced APS NAL unit shall have TemporalId less than max_tid_il_ref_pics_plus1[refPicVpsLayerId] (or max_tid_il_ref_pics_plus1[curPicVpsLayerId] [refPicVpsLayerId]), with refPicVpsLayerId equal to the VPS layer ID of the referenced layer or APS NAL unit (and curPicVpsLayerId equal to the layer ID of the picture associated with the PH).

As another example, the syntax element slice_alf_aps_id_chroma specifies the adaptation_parameter_set_id of the ALF APS that the chroma component of the slice refers to. If the value of nuh_layer_id of the APS NAL unit is equal to the value of nuh_layer_id of the coded slice NAL unit, the TemporalId of the APS NAL unit having aps_params_type equal to ALF_APS and adaptation_parameter_set_id equal to slice_alf_aps_id_chroma shall be less than or equal to the TemporalId of the coded slice NAL unit. Otherwise (the value of nuh_layer_id of the APS NAL unit is less than the value of nuh_layer_id of the coded slice NAL unit), the referenced APS NAL unit shall have TemporalId less than max_tid_il_ref_pics_plus1[refPicVpsLayerId] (or max_tid_il_ref_pics_plus1[curPicVpsLayerId][refPicVpsLayerId]), with refPicVpsLayerId equal to the VPS layer ID of the referenced layer or APS NAL unit (and curPicVpsLayerId equal to the VPS layer ID of the coded slice NAL unit). When slice_alf_enabled_flag is equal to 1 and slice_alf_aps_id_chroma is not present, the value of slice_alf_aps_id_chroma is inferred to be equal to the value of ph_alf_aps_id_chroma. The value of alf_chroma_filter_signal_flag of the APS NAL unit having aps_params_type equal to ALF_APS and adaptation_parameter_set_id equal to slice_alf_aps_id_chroma shall be equal to 1.

V. Sub-Bitstream Extraction Process

In some embodiments, certain NAL units in a bitstream can be extracted from a bitstream as a sub-bitstream. A sub-bitstream extraction process is a specified process by which NAL units in a bitstream that do not belong to a target set, determined by a target OLS index and a target highest TemporalId, are removed from the bitstream, with the output sub-bitstream (referred to as OutBitstream) consisting of the NAL units in the bitstream that belong to the target set.

In some embodiments, the output sub-bitstream OutBitstream is derived as follows:

The bitstream outBitstream is set to be identical to the bitstream inBitstream.

Remove from outBitstream all NAL units with TemporalId greater than tIdTarget.

Remove from outBitstream all NAL units with nal_unit_type not equal to any of VPS_NUT, DCI_NUT, and EOB_NUT and with nuh_layer_id not included in the list LayerIdInOls[targetOlsIdx].

Remove from outBitstream all NAL units for which all of the following conditions are true:

nal_unit_type is not equal to IDR_W_RADL, IDR_N_LP, or CRA_NUT.

nuh_layer_id is equal to LayerIdInOls[targetOlsIdx][j] for a value of j in the range of 0 to NumLayersInOls[targetOlsIdx]−1 inclusive.

TemporalId is greater than or equal to NumSubLayersInLayerInOLS[targetOlsIdx][j].

In some embodiments, NAL units can be removed or extracted from outBitstream for certain conditions are met. For example, such a condition may specify that a NAL unit is removed from outBitstream if the TemporalId of the NAL unit is greater than or equal to NumSubLayersInLayerInOLS[targetOlsIdx][j], or all NAL units having nal_unit_type in range of 0 to 13 and not equal to IDR_W_RADL, IDR_N_LP, or CRA_NUT are removed from outBitstream. In some embodiments, the constraint on NAL unit removal is applicable for VCL NAL units only. In other words, the constraint is not applicable to non-VCL units.

VI. Example Video Encoder

Figure 5:
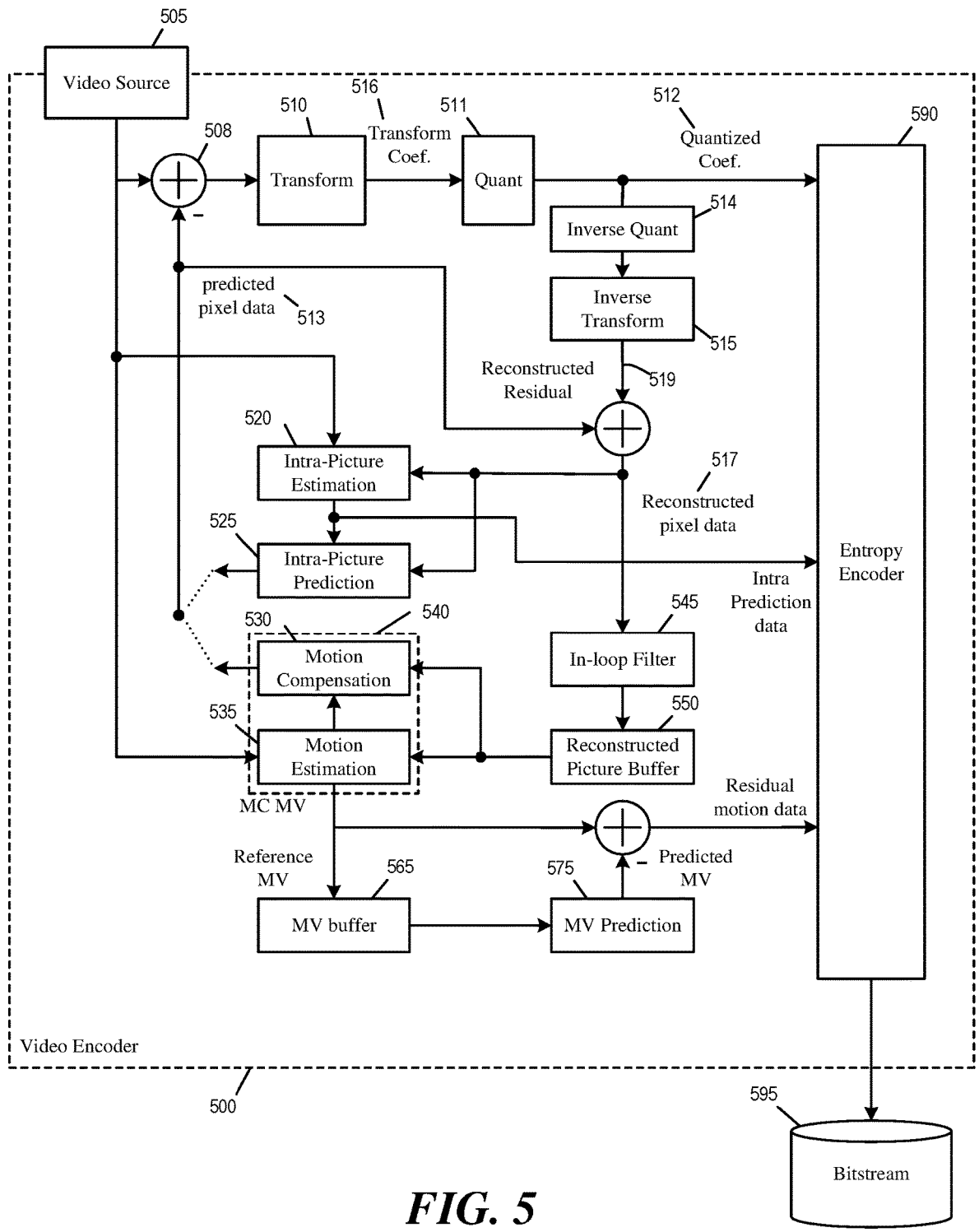
FIG. 5 illustrates an example video encoder that may perform inter-layer prediction.

FIG. 5 illustrates an example video encoder 500 that may perform inter-layer prediction. As illustrated, the video encoder 500 receives input video signal from a video source 505 and encodes the signal into bitstream 595. The video encoder 500 has several components or modules for encoding the signal from the video source 505, at least including some components selected from a transform module 510, a quantization module 511, an inverse quantization module 514, an inverse transform module 515, an intra-picture estimation module 520, an intra-prediction module 525, a motion compensation module 530, a motion estimation module 535, an in-loop filter 545, a reconstructed picture buffer 550, a MV buffer 565, and a MV prediction module 575, and an entropy encoder 590. The motion compensation module 530 and the motion estimation module 535 are part of an inter-prediction module 540.

In some embodiments, the modules 510-590 are modules of software instructions being executed by one or more processing units (e.g., a processor) of a computing device or electronic apparatus. In some embodiments, the modules 510-590 are modules of hardware circuits implemented by one or more integrated circuits (ICs) of an electronic apparatus. Though the modules 510-590 are illustrated as being separate modules, some of the modules can be combined into a single module.

The video source 505 provides a raw video signal that presents pixel data of each video frame without compression. A subtractor 508 computes the difference between the raw video pixel data of the video source 505 and the predicted pixel data 513 from the motion compensation module 530 or intra-prediction module 525. The transform module 510 converts the difference (or the residual pixel data or residual signal 509) into transform coefficients (e.g., by performing Discrete Cosine Transform, or DCT). The quantization module 511 quantizes the transform coefficients into quantized data (or quantized coefficients) 512, which is encoded into the bitstream 595 by the entropy encoder 590.

The inverse quantization module 514 de-quantizes the quantized data (or quantized coefficients) 512 to obtain transform coefficients, and the inverse transform module 515 performs inverse transform on the transform coefficients to produce reconstructed residual 519. The reconstructed residual 519 is added with the predicted pixel data 513 to produce reconstructed pixel data 517. In some embodiments, the reconstructed pixel data 517 is temporarily stored in a line buffer (not illustrated) for intra-picture prediction and spatial MV prediction. The reconstructed pixels are filtered by the in-loop filter 545 and stored in the reconstructed picture buffer 550. In some embodiments, the reconstructed picture buffer 550 is a storage external to the video encoder 500. In some embodiments, the reconstructed picture buffer 550 is a storage internal to the video encoder 500.

The intra-picture estimation module 520 performs intra-prediction based on the reconstructed pixel data 517 to produce intra prediction data. The intra-prediction data is provided to the entropy encoder 590 to be encoded into bitstream 595. The intra-prediction data is also used by the intra-prediction module 525 to produce the predicted pixel data 513.

The motion estimation module 535 performs inter-prediction by producing MVs to reference pixel data of previously decoded frames stored in the reconstructed picture buffer 550. These MVs are provided to the motion compensation module 530 to produce predicted pixel data.

Instead of encoding the complete actual MVs in the bitstream, the video encoder 500 uses MV prediction to generate predicted MVs, and the difference between the MVs used for motion compensation and the predicted MVs is encoded as residual motion data and stored in the bitstream 595.

The MV prediction module 575 generates the predicted MVs based on reference MVs that were generated for encoding previously video frames, i.e., the motion compensation MVs that were used to perform motion compensation. The MV prediction module 575 retrieves reference MVs from previous video frames from the MV buffer 565. The video encoder 500 stores the MVs generated for the current video frame in the MV buffer 565 as reference MVs for generating predicted MVs.

The MV prediction module 575 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 595 by the entropy encoder 590.

The entropy encoder 590 encodes various parameters and data into the bitstream 595 by using entropy-coding techniques such as context-adaptive binary arithmetic coding (CABAC) or Huffman encoding. The entropy encoder 590 encodes various header elements, flags, along with the quantized transform coefficients 512, and the residual motion data as syntax elements into the bitstream 595. The bitstream 595 is in turn stored in a storage device or transmitted to a decoder over a communications medium such as a network.

The in-loop filter 545 performs filtering or smoothing operations on the reconstructed pixel data 517 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 6:
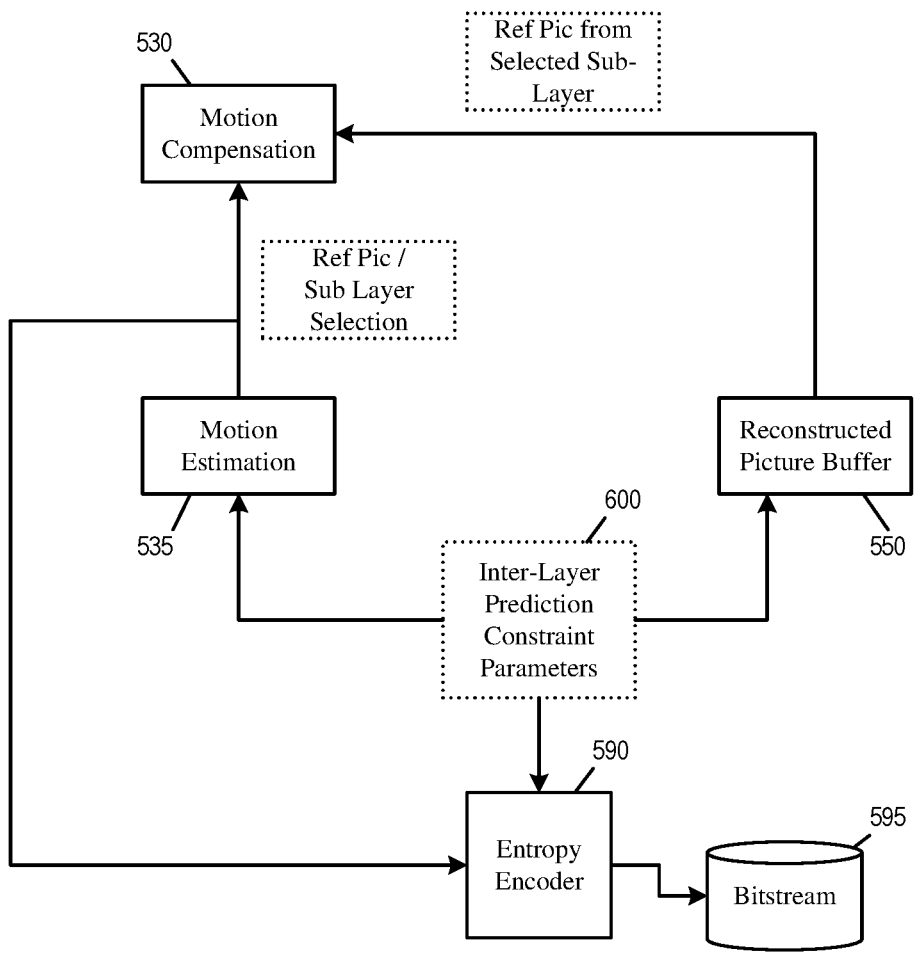
FIG. 6 illustrates portions of the video encoder that implement constraints on inter-layer prediction.

FIG. 6 illustrates portions of the video encoder 500 that implement constraints on inter-layer prediction. As illustrated, when the video encoder is performing inter-layer prediction for encoding a video picture, the motion estimation module 535 provides selection of reference pictures by identifying their layers and sublayers to the motion compensation module 530. The motion compensation module in turn fetches the selected video content from the reconstructed picture buffer 550, which stores video content for pictures in different layers and temporal sublayers. The selection of reference pictures is also provided to the entropy encoder 590 to be encoded into the bitstream 595.

The video encoder 500 determines a set of inter-layer prediction constraint parameters 600. The set of inter-layer prediction constraint parameters 600 may specify maximum sublayer or temporal identifier constraints for different combinations of the layer being coded and the layer being referenced (e.g., max_tid_il_ref_pics_plus1[i][j] for different pairs of i and j). The entropy encoder 590 encodes the set of inter-layer prediction constraint parameters 600 into the bitstream 595 (at e.g., VPS).

The inter-layer prediction constraint parameters 600 are used to configure the reconstructed picture buffer 550 and the motion estimation module 535. The reconstructed picture buffer 550 may be optimized for inter-layer prediction (e.g., to only store data for layers and sublayers that are eligible as ILRP). The inter-layer prediction constraint parameters 600 are also used to configure the motion estimation module 535 such that its search for reference pictures in reference layers is limited to only those satisfying the constraint parameters 600.

Figure 7:
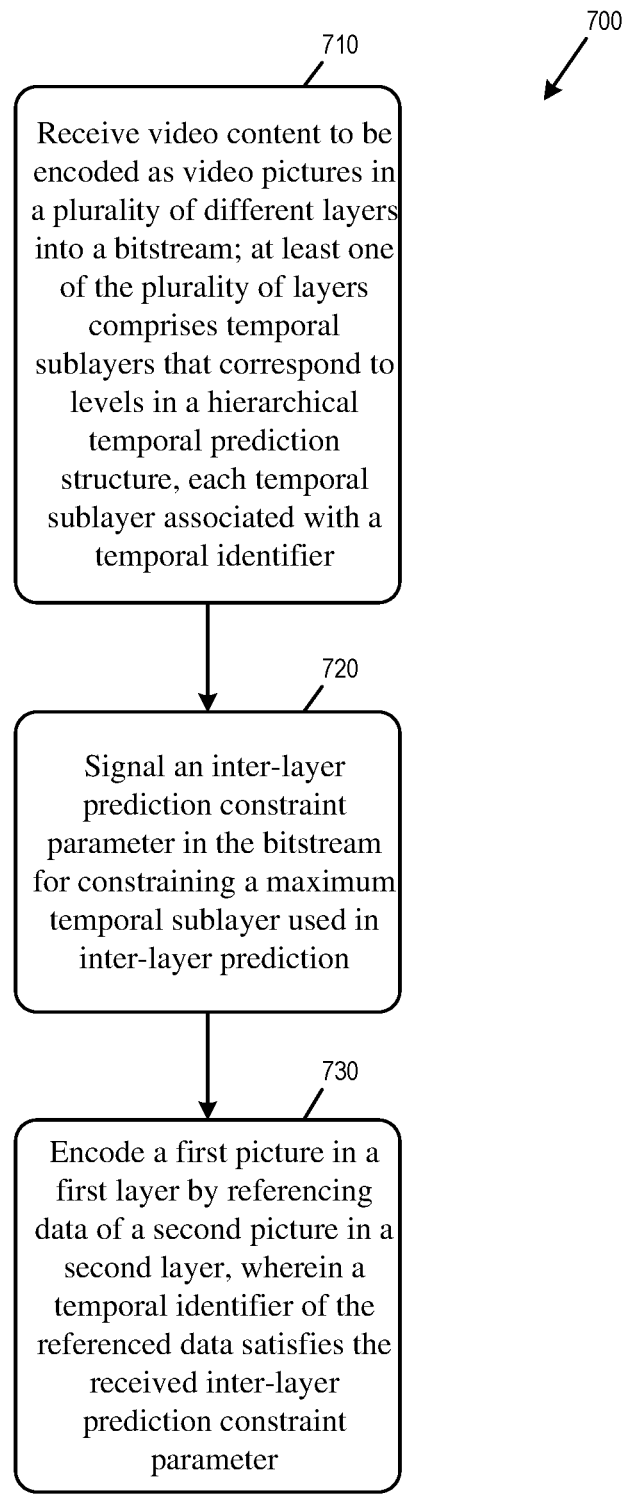
FIG. 7 conceptually illustrates a process for encoding video pictures using inter-layer prediction.

FIG. 7 conceptually illustrates a process 700 for encoding video pictures using inter-layer prediction. In some embodiments, one or more processing units (e.g., a processor) of a computing device that implements the encoder 500 performs the process 700 by executing instructions stored in a computer readable medium. In some embodiments, an electronic apparatus implementing the encoder 500 performs the process 700.

The encoder receives (at block 710) video content to be encoded as video pictures in a plurality of different layers into a bitstream. At least one of the plurality of layers include temporal sublayers that correspond to levels in a hierarchical temporal prediction structure. Each temporal sublayer is associated with a temporal identifier. The data of the video pictures are carried in network access level (NAL) units.

The encoder signals (at block 720) an inter-layer prediction constraint parameter (e.g., constraint on maximum temporal sublayer or max_tid_il_ref_pics_plus1) in the bitstream for constraining maximum temporal sublayer used in inter-layer prediction. In some embodiments, the inter-layer prediction constraint parameter is signaled in a video parameter set (VPS) that is applicable to the first picture when a particular flag in the VPS (e.g., max_tid_ref_present_flag) indicates that the inter-layer prediction constraint parameter is present.

The encoder encodes (at block 730) a first picture in a first layer by referencing data of a second picture in a second layer. A temporal identifier of the referenced data satisfies the received inter-layer prediction constraint parameter. The temporal identifier of the referenced data is coded in a header of a NAL unit carrying video content of the second picture in the second layer. In some embodiments, the temporal identifier of the referenced data satisfies the received inter-layer prediction constraint parameter when the temporal identifier is less than or equal to a value indicated by the inter-layer prediction constraint parameter. In some embodiments, the video decoder may disallow or bypass inter-layer prediction for the first picture when the inter-layer prediction constraint parameter is set to zero.

The video encoder may exclude a third picture to be used as reference for inter-layer prediction of the first picture when the third picture is associated with a temporal identifier that is greater than a value indicated by the inter-layer prediction constraint parameter.

In some embodiments, the inter-layer prediction constraint parameter is applicable only when the second layer is used as a reference layer for inter-layer prediction of the first layer and not applicable when another layer is used as the reference layer for inter-layer prediction of the first layer. When the inter-layer prediction constraint parameter is set to zero, the second layer is not used as a reference layer for encoding the first layer using inter-layer prediction. In some embodiments, each entry in an inter-layer reference prediction (ILRP) list (of a slice) of the first picture is either an RAP picture, or a reference picture in a reference layer having a temporal identifier that is less than an inter-layer prediction constraint parameter that is applicable to the first layer and the reference layer.

VII. Example Video Decoder

In some embodiments, an encoder may signal (or generate) one or more syntax element in a bitstream, such that a decoder may parse said one or more syntax element from the bitstream.

Figure 8:
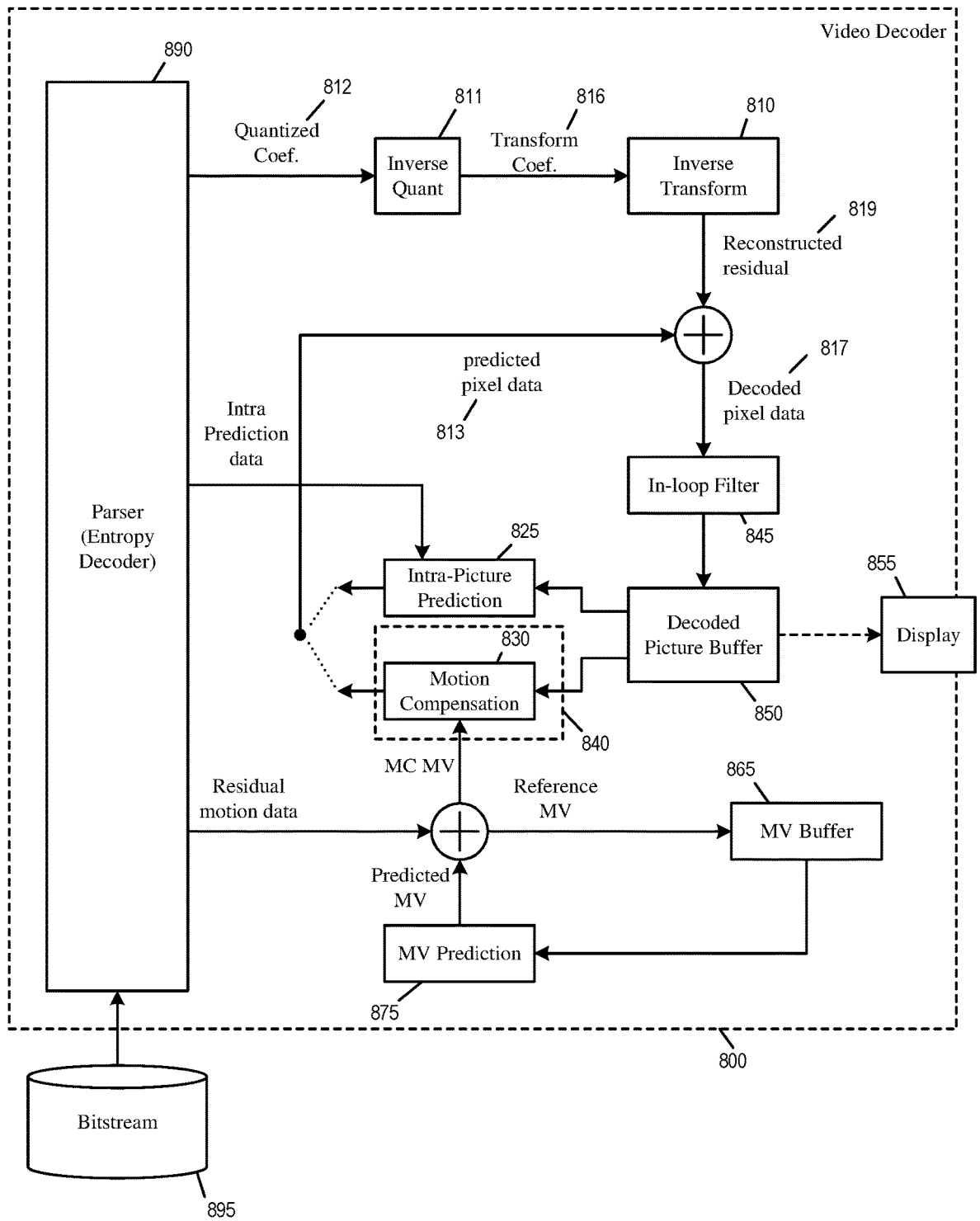
FIG. 8 illustrates an example video decoder that may perform inter-layer prediction.

FIG. 8 illustrates an example video decoder 800 that may perform inter-layer prediction. As illustrated, the video decoder 800 is an image-decoding or video-decoding circuit that receives a bitstream 895 and decodes the content of the bitstream into pixel data of video frames for display. The video decoder 800 has several components or modules for decoding the bitstream 895, including some components selected from an inverse quantization module 811, an inverse transform module 810, an intra-prediction module 825, a motion compensation module 830, an in-loop filter 845, a decoded picture buffer 850, a MV buffer 865, a MV prediction module 875, and a parser 890. The motion compensation module 830 is part of an inter-prediction module 840.

In some embodiments, the modules 810-890 are modules of software instructions being executed by one or more processing units (e.g., a processor) of a computing device. In some embodiments, the modules 810-890 are modules of hardware circuits implemented by one or more ICs of an electronic apparatus. Though the modules 810-890 are illustrated as being separate modules, some of the modules can be combined into a single module.

The parser 890 (or entropy decoder) receives the bitstream 895 and performs initial parsing according to the syntax defined by a video-coding or image-coding standard. The parsed syntax element includes various header elements, flags, as well as quantized data (or quantized coefficients) 812. The parser 890 parses out the various syntax elements by using entropy-coding techniques such as context-adaptive binary arithmetic coding (CABAC) or Huffman encoding.

The inverse quantization module 811 de-quantizes the quantized data (or quantized coefficients) 812 to obtain transform coefficients, and the inverse transform module 810 performs inverse transform on the transform coefficients 816 to produce reconstructed residual signal 819. The reconstructed residual signal 819 is added with predicted pixel data 813 from the intra-prediction module 825 or the motion compensation module 830 to produce decoded pixel data 817. The decoded pixels data are filtered by the in-loop filter 845 and stored in the decoded picture buffer 850. In some embodiments, the decoded picture buffer 850 is a storage external to the video decoder 800. In some embodiments, the decoded picture buffer 850 is a storage internal to the video decoder 800.

The intra-prediction module 825 receives intra-prediction data from bitstream 895 and according to which, produces the predicted pixel data 813 from the decoded pixel data 817 stored in the decoded picture buffer 850. In some embodiments, the decoded pixel data 817 is also stored in a line buffer (not illustrated) for intra-picture prediction and spatial MV prediction.

In some embodiments, the content of the decoded picture buffer 850 is used for display. A display device 855 either retrieves the content of the decoded picture buffer 850 for display directly, or retrieves the content of the decoded picture buffer to a display buffer. In some embodiments, the display device receives pixel values from the decoded picture buffer 850 through a pixel transport.

The motion compensation module 830 produces predicted pixel data 813 from the decoded pixel data 817 stored in the decoded picture buffer 850 according to motion compensation MVs (MC MVs). These motion compensation MVs are decoded by adding the residual motion data received from the bitstream 895 with predicted MVs received from the MV prediction module 875.

The MV prediction module 875 generates the predicted MVs based on reference MVs that were generated for decoding previous video frames, e.g., the motion compensation MVs that were used to perform motion compensation. The MV prediction module 875 retrieves the reference MVs of previous video frames from the MV buffer 865. The video decoder 800 stores the motion compensation MVs generated for decoding the current video frame in the MV buffer 865 as reference MVs for producing predicted MVs.

The in-loop filter 845 performs filtering or smoothing operations on the decoded pixel data 817 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 9:
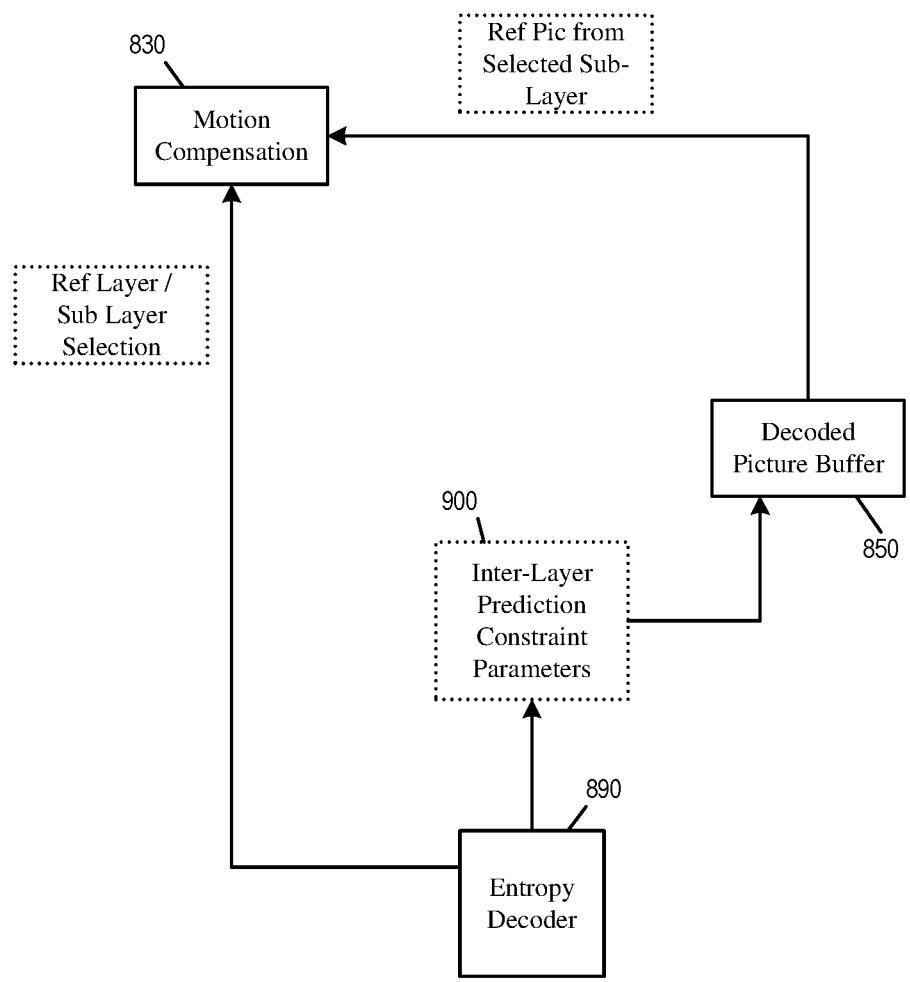
FIG. 9 illustrates portions of the video decoder that implement constraints on inter-layer prediction.

FIG. 9 illustrates portions of the video decoder 800 that implement constraints on inter-layer prediction. As illustrated, when the video decoder is performing inter-layer prediction for decoding a video picture, the entropy decoder 890 provides selection of reference pictures by identifying their layers and sublayers to the motion compensation module 530. The motion compensation module in turn fetches the selected video content from the decoded picture buffer 850, which stores video content for different layers and sublayers.

The entropy decoder 890 receives a set of inter-layer prediction constraint parameters 900 from the bitstream 895. The set of inter-layer prediction constraint parameters 900 may specify maximum sublayer or temporal identifier constraints for different combinations of the layer being coded and the layer being referenced (e.g., max_tid_il_ref_pics_plus1[i][j] for different pairs of i and j).

The inter-layer prediction constraint parameters 900 are used to configure the decoded picture buffer 850. In some embodiments, the decoded picture buffer 850 may be optimized for inter-layer prediction (e.g., to only store data for layers and sublayers that are eligible as ILRP).

Figure 10:
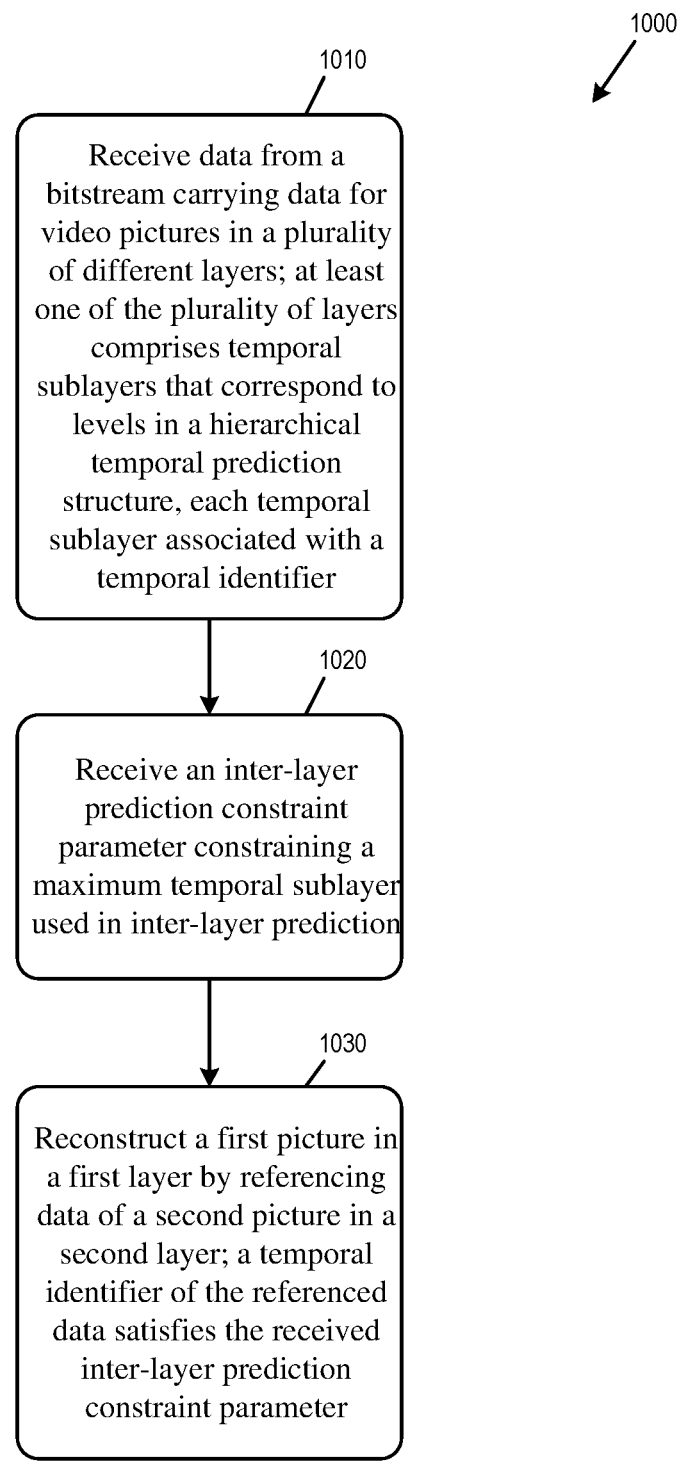
FIG. 10 conceptually illustrates a process for decoding video pictures using inter-layer prediction.

FIG. 10 conceptually illustrates a process 1000 for decoding video pictures using inter-layer prediction. In some embodiments, one or more processing units (e.g., a processor) of a computing device implements the decoder 800 performs the process 1000 by executing instructions stored in a computer readable medium. In some embodiments, an electronic apparatus implementing the decoder 800 performs the process 1000.

The decoder receives (at block 1010) data from a bitstream carrying data for video pictures in a plurality of different layers. At least one of the plurality of layers has temporal sublayers that correspond to levels in a hierarchical temporal prediction structure. Each temporal sublayer is associated with a temporal identifier. The data of the video pictures are carried in network access level (NAL) units.

The decoder receives (at block 1020) an inter-layer prediction constraint parameter (e.g., max_tid_il_ref_pics_plus1) constraining maximum temporal sublayer used in inter-layer prediction. In some embodiments, the inter-layer prediction constraint parameter is signaled in a video parameter set (VPS) that is applicable to the first picture when a particular flag in the VPS (e.g., max_tid_ref_present_flag) indicates that the inter-layer prediction constraint parameter is present.

The decoder reconstructs (at block 1030) a first picture in a first layer by referencing data of a second picture in a second layer. A temporal identifier of the referenced data satisfies the received inter-layer prediction constraint parameter. The temporal identifier of the referenced data is coded in a header of a NAL unit carrying video content of the second picture in the second layer. In some embodiments, the temporal identifier of the referenced data satisfies the received inter-layer prediction constraint parameter when the temporal identifier is less than or equal to a value indicated by the inter-layer prediction constraint parameter. In some embodiments, the video decoder may disallow or bypass inter-layer prediction for the first picture when the inter-layer prediction constraint parameter is set to zero.

The video decoder may exclude a third picture to be used as reference for inter-layer prediction of the first picture when the third picture is associated with a temporal identifier that is greater than a value indicated by the inter-layer prediction constraint parameter.

In some embodiments, the inter-layer prediction constraint parameter is applicable only when the second layer is used as a reference layer for inter-layer prediction of the first layer and not applicable when another layer is used as the reference layer for inter-layer prediction of the first layer. When the inter-layer prediction constraint parameter is set to zero, the second layer is not used as a reference layer for decoding the first layer using inter-layer prediction. In some embodiments, each entry in an inter-layer reference prediction (ILRP) list (of a slice) of the first picture is either an RAP picture, or a reference picture in a reference layer having a temporal identifier that is less than an inter-layer prediction constraint parameter that is applicable to the first layer and the reference layer.

VIII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 11:
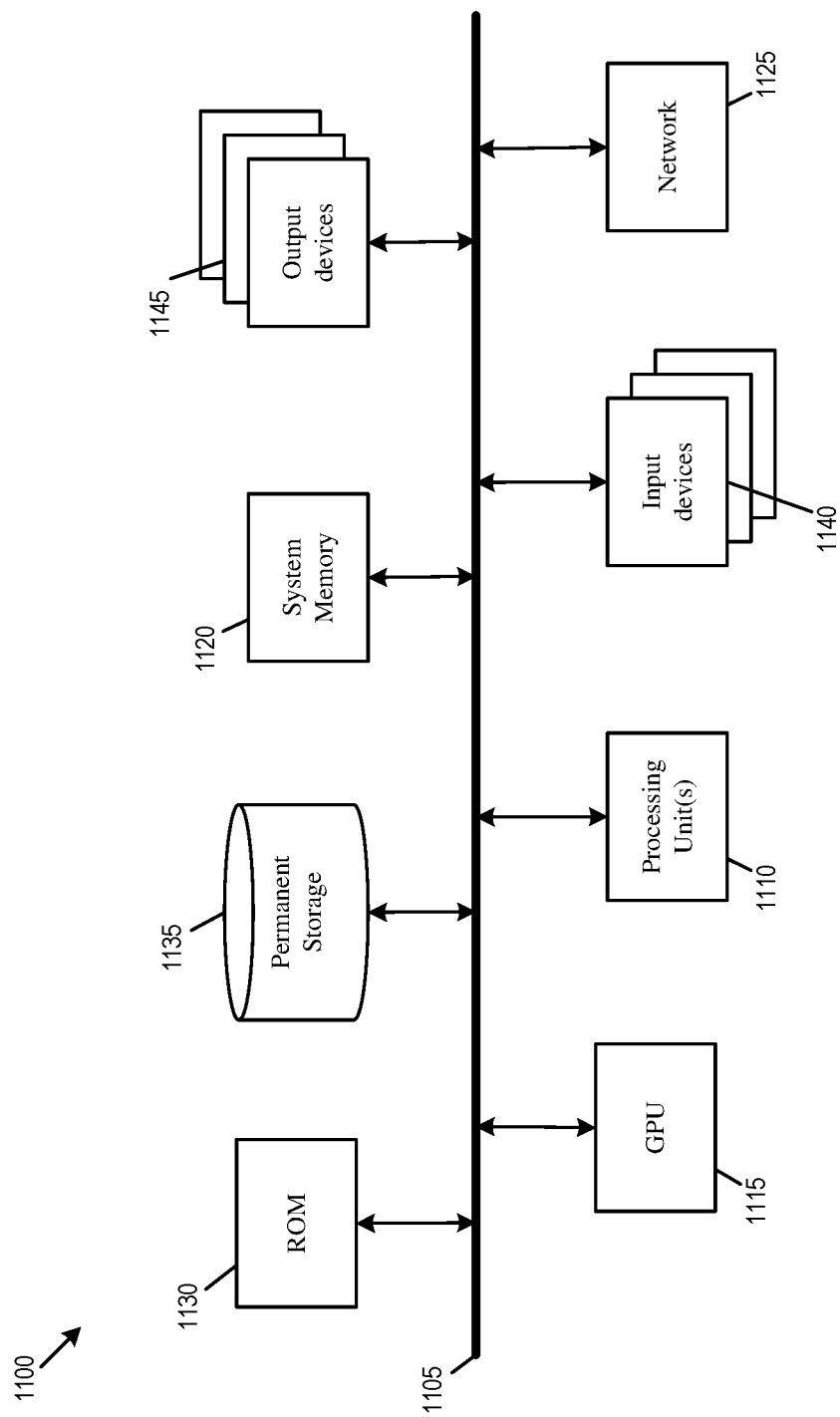
FIG. 11 conceptually illustrates an electronic system with which some embodiments of the present disclosure are implemented.

FIG. 11 conceptually illustrates an electronic system 1100 with which some embodiments of the present disclosure are implemented. The electronic system 1100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1100 includes a bus 1105, processing unit(s) 1110, a graphics-processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the GPU 1115, the read-only memory 1130, the system memory 1120, and the permanent storage device 1135.

From these various memory units, the processing unit(s) 1110 retrieves instructions to execute and data to process in order to execute the processes of the present disclosure. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are used by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the present disclosure use a mass-storage device (such as a magnetic or optical disk and its corresponding disk drive) as the permanent storage device 1135.

Other embodiments use a removable storage device (such as a floppy disk, flash memory device, etc., and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor uses at runtime. In some embodiments, processes in accordance with the present disclosure are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alpha-numeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 7 and FIG. 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
receiving data from a bitstream carrying data of video pictures in a plurality of different layers, wherein at least one of the plurality of layers comprises temporal sublayers that correspond to levels in a hierarchical temporal prediction structure, each temporal sublayer associated with a temporal identifier;
receiving an inter-layer prediction constraint parameter, the inter-layer prediction constraint parameter indicating a maximum temporal identifier; and reconstructing a first picture in a first layer by performing inter-layer prediction by referencing one or more coding parameters of an Adaptation Parameter Set (APS) in a second layer, wherein the second layer is among the at least one of the plurality of layers, wherein the maximum temporal identifier is specific to a combination of the first layer and the second layer, and wherein the temporal identifier of the temporal sublayer to which the APS belongs satisfies the received inter-layer prediction constraint parameter.

2. The video decoding method of claim 1, wherein the data of the video pictures are carried in network access level (NAL) units, and wherein the temporal identifier of the referenced data is coded in a header of a NAL unit carrying video content of the APS.

3. The video decoding method of claim 1, wherein the inter-layer prediction constraint parameter is signaled in a video parameter set (VPS) that is applicable to the first picture when a particular flag in the VPS indicates that the inter-layer prediction constraint parameter is present.

4. The video decoding method of claim 1, wherein the temporal identifier of the temporal sublayer to which the APS belongs satisfies the received inter-layer prediction constraint parameter when the temporal identifier is less than or equal to the maximum temporal identifier.

5. The video decoding method of claim 1, further comprising excluding a third picture to be used as reference for inter-layer prediction of the first picture when the third picture is associated with a temporal identifier that is greater than the maximum temporal identifier.

6. The video decoding method of claim 1, further comprising bypassing inter-layer prediction for the first picture when the inter-layer prediction constraint parameter is set to zero.

7. The video decoding method of claim 1, wherein the inter-layer prediction constraint parameter is applicable when the second layer is used as a reference layer for inter-layer prediction of the first layer and not applicable when another layer is used as the reference layer for inter-layer prediction of the first layer.

8. The video decoding method of claim 7, wherein when the inter-layer prediction constraint parameter is set to zero, the second layer is not used as a reference layer for decoding the first layer using inter-layer prediction.

9. The video decoding method of claim 1, wherein an entry in an inter-layer reference prediction (ILRP) list of the first picture is a reference picture in a reference layer having a temporal identifier that satisfies an inter-layer prediction constraint parameter that is applicable to the first layer and the reference layer.

10. The video decoding method of claim 1, wherein each entry in an inter-layer reference prediction (ILRP) list of the first picture is either an intra random access point picture (IRAP) or a reference picture in a reference layer having a temporal identifier that satisfies an inter-layer prediction constraint parameter that is applicable to the first layer and the reference layer.

11. A video encoding method, comprising:

receiving video content to be encoded as video pictures in a plurality of different layers into a bitstream, wherein at least one of the plurality of layers comprises temporal sublayers that correspond to levels in a hierarchical temporal prediction structure, each temporal sublayer associated with a temporal identifier;

signaling an inter-layer prediction constraint parameter in the bitstream, the inter-layer prediction constraint parameter indicating a maximum temporal identifier; and encoding a first picture in a first layer by performing inter-layer prediction by referencing one or more coding parameters of an Adaptation Parameter Set (APS) in a second layer, wherein a temporal identifier of the APS satisfies the inter-layer prediction constraint parameter, and wherein the maximum temporal identifier is specific to a combination of the first layer and the second layer.

12. An electronic apparatus, comprising:

a video decoder circuit configured to perform operations comprising:

receiving data from a bitstream carrying data of video pictures in a plurality of different layers, wherein at least one of the plurality of layers comprises temporal sublayers that correspond to levels in a hierarchical temporal prediction structure, each temporal sublayer associated with a temporal identifier;

receiving an inter-layer prediction constraint parameter, the inter-layer prediction constraint parameter indicating a maximum temporal identifier; and reconstructing a first picture in a first layer by performing inter-layer prediction by referencing one or more coding parameters of an Adaptation Parameter Set (APS) in a second layer, wherein the second layer is among the at least one of the plurality of layers, wherein the maximum temporal identifier is specific to a combination of the first layer and the second layer, and wherein the temporal identifier of the temporal sublayer to which the APS belongs satisfies the received inter-layer prediction constraint parameter.

\* \* \* \* \*